United States Patent
Summers

(10) Patent No.: US 10,190,696 B2
(45) Date of Patent: Jan. 29, 2019

(54) VALVE RETAINING CUP

(71) Applicant: GOODRICH CORPORATION, Charlotte, NC (US)

(72) Inventor: Herbert S. Summers, Trotwood, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 126 days.

(21) Appl. No.: 15/217,593

(22) Filed: Jul. 22, 2016

(65) Prior Publication Data

US 2018/0023717 A1 Jan. 25, 2018

(51) Int. Cl.
| | |
|---|---|
| *F16K 11/044* | (2006.01) |
| *F16K 27/02* | (2006.01) |
| *F16K 11/056* | (2006.01) |
| *F15B 13/02* | (2006.01) |

(52) U.S. Cl.
CPC ........ *F16K 27/0263* (2013.01); *F15B 13/028* (2013.01); *F16K 11/044* (2013.01); *F16K 11/056* (2013.01); *F15B 2211/3052* (2013.01); *Y10T 137/2567* (2015.04)

(58) Field of Classification Search
CPC ......... Y10T 137/2567; Y10T 137/2569; F16K 11/044; F16K 11/056
USPC ....................................................... 251/337
See application file for complete search history.

(56) References Cited

U.S. PATENT DOCUMENTS

| | | | | |
|---|---|---|---|---|
| 2,583,539 | A * | 1/1952 | Bashark | F16K 3/24 137/112 |
| 2,634,743 | A * | 4/1953 | Audemar | F15B 7/003 137/112 |
| 2,685,296 | A | 8/1954 | Boosman | |
| 3,008,482 | A | 11/1961 | Hunter | |
| 4,798,221 | A | 1/1989 | Crawford et al. | |
| 6,183,050 | B1 | 2/2001 | Ganzel | |
| 6,296,008 | B1 * | 10/2001 | Boyer | F17C 13/045 137/113 |
| 7,739,940 | B2 * | 6/2010 | Hiroshima | F15B 11/02 137/112 |
| 8,469,048 | B2 * | 6/2013 | Bresnahan | F15B 13/028 137/112 |

FOREIGN PATENT DOCUMENTS

| | | |
|---|---|---|
| GB | 144206 A | 6/1920 |
| GB | 2069645 A | 8/1981 |
| GB | 2431205 A | 4/2007 |
| WO | 0227223 A2 | 4/2002 |

* cited by examiner

Primary Examiner — Kevin F Murphy
(74) Attorney, Agent, or Firm — Snell & Wilmer L.L.P.

(57) ABSTRACT

A valve including a valve housing, a casing, a spring guide, and a retaining cup. The casing may be disposed within the valve housing and may include a bore. The spring guide may be disposed within the bore and the retaining cup may be disposed partially around the casing to engage and retain the spring guide at least partially within the bore of the casing.

16 Claims, 3 Drawing Sheets

SECTION A-A

VALVE RETAINING CUP

FIELD

The present disclosure relates to valve assemblies, and more specifically, to retaining elements for valve assemblies.

BACKGROUND

Retaining elements, such as retaining rings and snap rings, are often utilized in valve assemblies, such as shuttle valves, to retain components of the valve assembly in place. However, conventional retaining elements, such as retaining rings and snap rings, can become dislodged, broken, or otherwise damaged, whether due to improper installation or due to normal wear, thereby compromising the valve assembly.

SUMMARY

In various embodiments, the present disclosure provides a valve that includes a valve housing, a casing, a spring guide, and a retaining cup. The casing may be disposed within the valve housing and may include a bore. The spring guide may be disposed within the bore and the retaining cup may be disposed partially around the casing to engage and retain the spring guide at least partially within the bore of the casing.

In various embodiments, the valve may be a shuttle valve having two inlets and an outlet. In various embodiments, the outlet includes the bore and engagement between the retaining cup and the spring guide is configured to allow fluid to flow through the bore and past the retaining cup. In various embodiments, the shuttle valve includes a blocking ball retained in the casing configured to switchably block one of the two inlets. The spring guide may include a head, a spring, and a ball engagement element. In various embodiments, the head engages the retaining cup, the spring is retained between the head and the ball engagement element, and the ball engagement element engages an intermediate ball disposed between the ball engagement element and the blocking ball.

In various embodiments, the casing has a circular outer surface and the retaining cup includes an annular shoulder that is disposed partially around and engages the circular outer surface of the casing. In various embodiments, the annular shoulder defines a pass-through aperture and the retaining cup includes a prong extending from the annular shoulder in a direction substantially perpendicular to an opening of the pass-through aperture. In various embodiments, an inner surface of the prong engages the spring guide. The inner surface of the prong may be planar and the inner surface of the prong may engage a head of the spring guide to prevent rotation of the spring guide about an axis parallel to a longitudinal axis of the bore of the casing.

In various embodiments, the valve is a shuttle valve having two inlets and an outlet and at least a portion of one of the two inlets is disposed in the pass-through aperture of the annular shoulder. In various embodiments, the bore in the casing is a first bore and the spring guide is a first spring guide, wherein the casing includes a second bore and a second spring guide disposed within the second bore such that the retaining cup engages and retains the second spring guide at least partially within the second bore. In various embodiments, the casing includes a third bore and a third spring guide disposed within the third bore such that the retaining cup engages and retains the third spring guide at least partially within the third bore. In various embodiments, the casing has a circular outer surface and the retaining cup comprises an annular shoulder that is disposed partially around and engages the circular outer surface of the casing. Further, the first, second, and third bores may be circumferentially distributed 120 degrees from each other.

In various embodiments, the retaining cup is positioned between and directly engages an outer surface of the casing and an inner surface of the valve housing. In various embodiments, the retaining cup may be made from a stainless steel material.

Also disclosed herein, according to various embodiments, is a retaining cup for a valve assembly. The retaining cup may include an annular shoulder defining a pass-through aperture and a prong extending from the annular shoulder in a direction substantially perpendicular to an opening of the pass-through aperture, wherein the prong comprises an inner surface that is planar. In various embodiments, the prong is a first prong and the retaining cup further includes second and third prongs extending from the annular shoulder. In various embodiments, the retaining cup is made from a stainless steel material.

Also disclosed herein, according to various embodiments, is a method of manufacturing a valve. The method includes loading a spring guide within a bore of a casing, positioning a retaining cup about an outer surface of the casing to engage and retain the spring guide at least partially within the bore of the casing, and enclosing the casing within a valve housing. In various embodiments, positioning the retaining cup includes aligning a prong of the retaining cup with the bore such that a head of the spring guide engages a planar inner surface of the prong.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
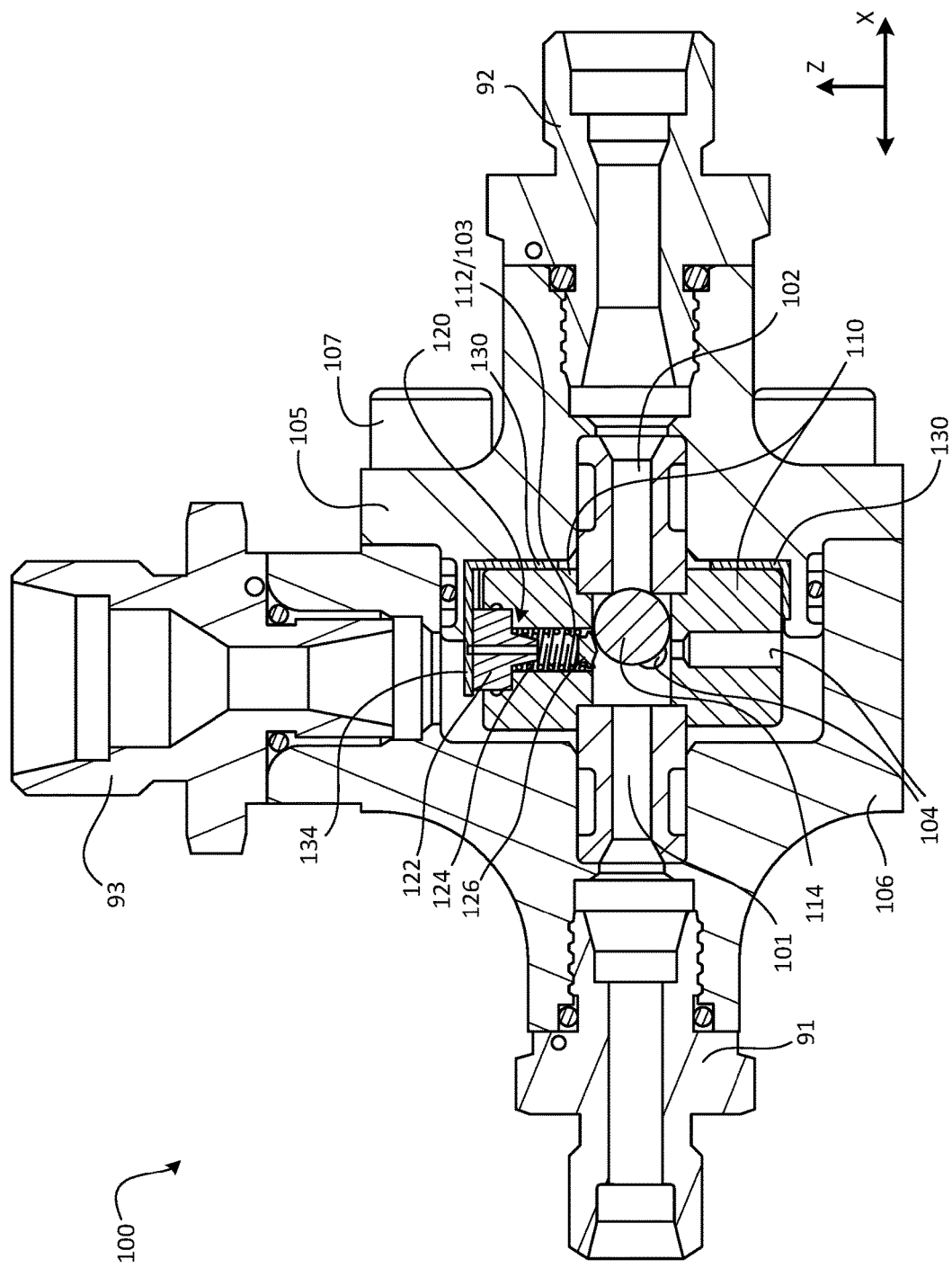
FIG. 1 illustrates a cross-section view of a valve having a retaining cup, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a valve having a retaining cup is disclosed herein. More specifically, a retaining cup positioned within a valve housing for retaining various valve components is disclosed herein, in accordance with various embodiments. As described in greater detail below, the retaining cup, in various embodiments, reliably retains a spring guide within a bore of casing, thus preventing any components of the valve from becoming dislodged and thereby maintaining the structural and operational integrity of the valve.

FIG. 1 is a cross-section view of a valve 100 that includes, according to various embodiments, a valve housing 105, 106, a casing 110, a spring guide 120, and a retaining cup 130. In various embodiments, the valve 100 is a shuttle valve that includes two inlets 101, 102 and an outlet 103. Shuttle valves are used in many types of pneumatic or hydraulic control systems, referred to hereinafter for convenience as "fluid" control systems. A shuttle valve, according to various embodiments, is a passive device that is used in pneumatic/hydraulic control applications where a signal is selected from two or more different sources. In FIG. 1, a first inlet coupler 91 is configured to be attached to a first fluid source in order to provide fluid to the first inlet 101 of the valve 100, according to various embodiments. Valve 100 also includes a second inlet coupler 92 that is configured to attach to a second fluid source in order to provide fluid to the second inlet 102 of the valve 100, according to various embodiments. The valve 100 may also include an outlet coupler 93 that is configured to attach to and deliver fluid to an actuator via outlet 103. In various embodiments, while the terms "inlet" and "outlet" are used repeatedly throughout the present disclosure, such terms do not preclude reverse flow of the fluid.

Shuttle valves may be used in certain fluid control systems where the supply of fluid to a subsystem, such as a braking actuator, may be from more than one source to meet reliability or safety requirements. Shuttle valves may be used in braking assemblies for aircrafts to control whether a 'pedal-braking' value (e.g., fluid pressure) is delivered to the braking actuator or whether an emergency- or parking-braking value is delivered to the braking actuator. For example, a pedal-braking fluid pressure may be communicated through the first inlet 101 of the valve 100, which pressure may cause a blocking element, such as blocking ball 114 to move towards and obstruct the second inlet 102 of the valve 100, thereby isolating the downstream braking actuator from the second fluid source and allowing the pedal-braking fluid pressure to be delivered/communicated to the braking actuator via the outlet 103 of the valve 100. In various embodiments, the valve 100 may include additional outlets 104, as described in greater detail below. In response to demand, an emergency-braking fluid pressure, which may be greater than the pedal-braking fluid pressure, may be communicated through the second inlet 102 of the valve 100, thereby causing the blocking ball 114 to move towards and obstruct the first inlet 101 of the valve, thus isolating the downstream braking actuator from the first fluid source and allowing the emergency-braking fluid pressure to be delivered/communicated to the braking actuator via the outlet 103 of the valve 100.

XZ axes are shown in the figures for convenience, with the Z axis extending perpendicular to the xy plane. In that regard, a measurement point displaced in the positive Z axis direction from a given reference point may be considered "above" or on "top" of the given reference point. In contrast, a measurement point displaced in the negative z axis direction from the given reference point may be considered "below" or on "bottom" of the given reference point. In that regard, the terms "top" and "bottom" may refer to relative positions along the Z axis.

In various embodiments, the casing 110 may be disposed within a valve housing. The valve housing according to various embodiments, may include a first portion 105 and a second portion 106 that are mounted together using one or more fasteners 107. The casing 110, according to various embodiments, may be disposed between and in fluid communication with the first and second inlets 101, 102. In various embodiments, the casing 110 includes the blocking ball 114, briefly described above, that is movable within the casing 110 to block/obstruct either inlet 101, 102. The casing 110, according to various embodiments, may also include a bore 112. In various embodiments, the bore 112 extends from and is open to a chamber in which the blocking ball 114 is housed. In various embodiments, the bore 112 may be implemented as the outlet 103 of the valve 100 or the bore 112 may be in fluid communication with a valve outlet. In various embodiments, the valve 100 may include additional outlets 104 circumferentially spaced apart, e.g., 120 degrees apart. In various embodiments, the bore 112 may not be an outlet (outlets 104 may be the only outlets from the casing 110) and instead may be the channel within which a spring guide 120 is retained. Details pertaining to the spring guide 120 are included below.

In various embodiments, an intermediate ball may be disposed, at least partially within the bore 12 of the casing 110. The intermediate ball may be retained between and directly engaged with the blocking ball 114 and a spring guide 120. The spring guide 120 may include, according to various embodiments, a head 122, a spring 124, and a ball engagement element 126. In various embodiments, the spring guide 120 is disposed at least partially within the bore 112 of the casing 110. The spring guide 120 may be coupled and/or retained relative to the casing 110 in order to bias the intermediate ball into contact with the blocking ball 114. For example, the head 122 of the spring guide 120 may be retained by the retaining cup 130, described below in greater detail, and the ball engagement element 126 may engage the intermediate ball.

Figure 2:
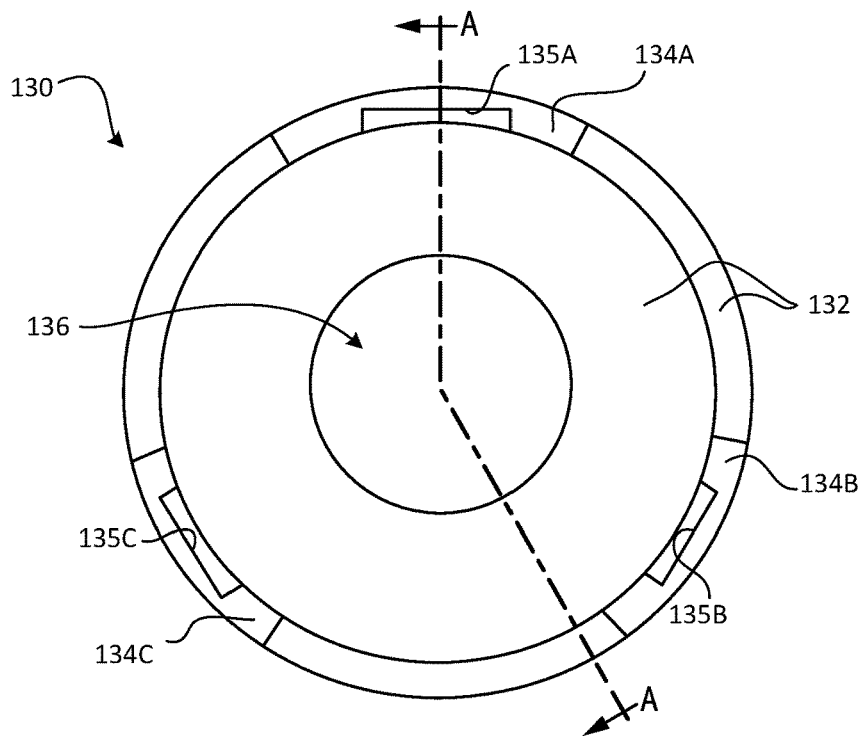
FIG. 2 illustrates a side view of a retaining cup, in accordance with various embodiments.
Figure 3:
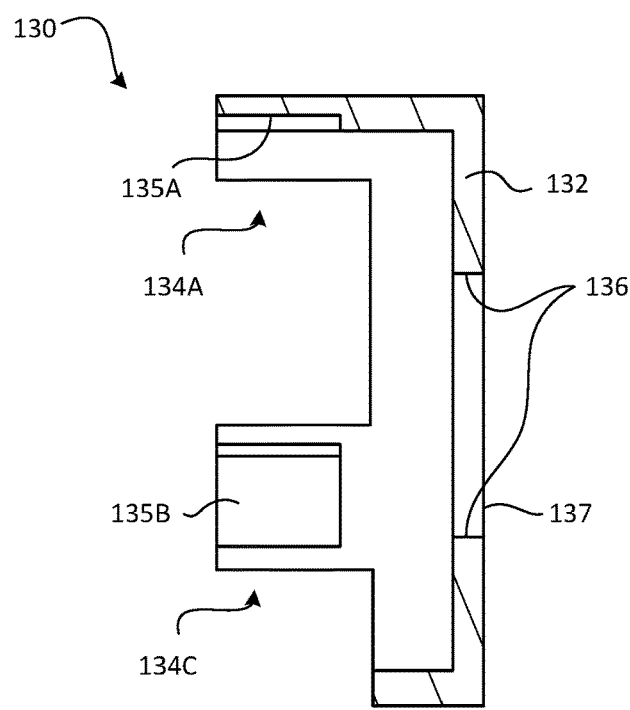
FIG. 3 illustrates a cross-section view of the retaining cup of FIG. 2, in accordance with various embodiments.

In various embodiments, and with additional reference to FIGS. 2 and 3, the retaining cup 130 is included in the valve 100 to secure and retain the spring guide 120 in place within the bore 112 of the casing 110. FIG. 2 includes an indication, viewpoint line A, of the perspective from which the cross-section of FIG. 3 is illustrated. Generally, the retaining cup 130 engages the casing 110 and extends at least partially over an outlet side of the bore 112 of the casing 110 to hold the spring guide 120 in place. In various embodiments, the casing 110 may have multiple bores, each one having a respective spring guide disposed therein. In such embodiments, the retaining cup 130 may be configured to at least partially wrap around the casing 110 to retain each of the spring guides within its respective bore.

In various embodiments, the retaining cup 130 has an annular shoulder 132 that is disposed partially around and engages an outer surface of the casing 110. The retaining cup 130 may also be disposed between and directly engage the casing 110 and the valve housing 105, 106. In various embodiments, the annular shoulder 132 of the retaining cup 130 defines a pass-through aperture 136. The pass-through aperture 136 enables the retaining cup 130 to be disposed on a lateral side of the casing 110 such that the second inlet 102, for example, is disposed and extends through the pass-through aperture 136.

In various embodiments, the retaining cup 130 may also include one or more prongs 134A, 134B, 134C (collective reference number 134) that extend from the annular shoulder 132 in a direction substantially perpendicular to an opening 137 (FIG. 3) of the pass-through aperture 136. In various embodiments, the casing 110 is disk-like and thus has a circular outer surface. The annular shoulder 132 of the retaining cup 130, according to various embodiments, may fit around the disk-like casing 110 such that at least the prongs 134 of the retaining cup 130 extend axially across the disk-like circular surface of the casing 110 to cover/block the outlet end of the bore 112, thereby holding the spring guide 120 within the bore 112. For example, the retaining cup 130 may include three prongs 134A, 134B, 134C that are spaced 120 degrees apart and that are configured to at least partially cover the outlet ends of three respective bores in the casing to hold three respective spring guides in place.

In various embodiments, at least a portion of an inner surface of the prong(s) 134 has a planar surface 135A, 135B, 135C (collective reference number 135), thereby facilitating a secure engagement with the head 122 of the spring guide 120 to prevent the spring guide 120 from becoming dislodged from the bore 112 of the casing 110. In various embodiments, the planar surface 135 of the prong 134 also prohibits rotation of the spring guide 120 about an axis parallel to a longitudinal axis of the bore 112. In various embodiments, engagement between the retaining cup 130 and the spring guide 120 is such that fluid is still able to flow from the bore 112 of the casing 110 past the retaining cup 130. For example, the prong 134 of the retaining cup 130 may have an aperture through which fluid may flow, or the prong 134 may not completely extend over and cover the bore 112, thereby providing sufficient retaining force while still allowing fluid to flow from the bore 112 passed the retaining cup 130 towards the outlet 103 and/or outlet coupler 93.

Figure 4:
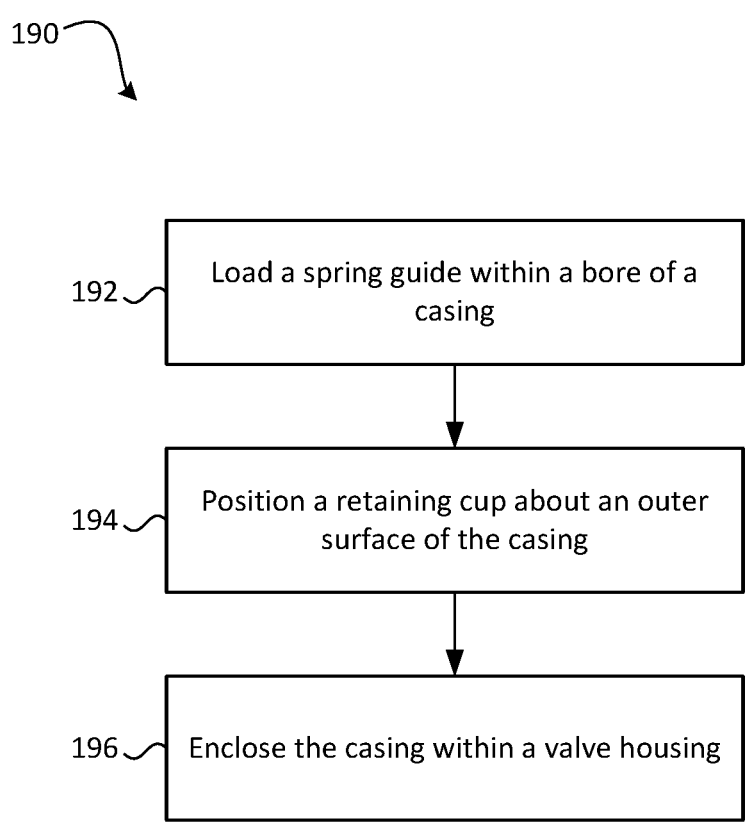
FIG. 4 is a schematic flowchart diagram of a method of manufacturing a valve, in accordance with various embodiments.

FIG. 4 is a schematic flowchart diagram of a method 190 for manufacturing a valve. In various embodiments, the method 190 includes loading (step 192) the spring guide 120 within the bore 112 of the casing 110. The method 190 may further include positioning (step 194) the retaining cup 130 about at least a portion of an outer surface of the casing 110 to engage and retain the spring guide 120 at least partially within the bore 112 of the casing 110, according to various embodiments. The method 190 may also include, according to various embodiments, enclosing (step 196) the casing 110 within a valve housing 105, 106. In various embodiments, positioning (step 194) the retaining cup 130 includes aligning the 134 prong of the retaining cup 130 with the bore 112 such that the head 122 of the spring guide 120 engages a planar surface 135 of the prong 134.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A valve comprising:
a valve housing;
a casing disposed within the valve housing, the casing comprising a bore;
a spring guide disposed within the bore; and
a retaining cup disposed partially around the casing to engage and retain the spring guide at least partially within the bore of the casing;
wherein:
the valve is a shuttle valve comprising two inlets and an outlet;
the shuttle valve comprises a blocking ball retained in the casing configured to switchably block one of the two inlets;
the spring guide comprises a head, a spring, and a ball engagement element;
the head engages the retaining cup, the spring is retained between the head and the ball engagement element, and the ball engagement element engages the blocking ball.

2. The valve of claim 1, wherein:
the retaining cup comprises an annular shoulder defining a pass-through aperture; and
a longitudinal axis of the bore is perpendicular to a central axis extending through the pass-through aperture.

3. The valve of claim 2, wherein:
the outlet comprises the bore; and
engagement between the retaining cup and the spring guide is configured to allow fluid to flow through the bore and past the retaining cup.

4. The valve of claim 1, wherein the casing has a circular outer surface, wherein the retaining cup comprises an annular shoulder that is disposed partially around and engages the circular outer surface of the casing.

5. The valve of claim 4, wherein:
the annular shoulder of the retaining cup defines a pass-through aperture;
a longitudinal axis of the bore is perpendicular to a central axis extending through the pass-through aperture;
the retaining cup comprises a prong extending from the annular shoulder in a direction substantially parallel to the central axis extending through the pass-through aperture and substantially perpendicular to the longitudinal axis of the bore;
the longitudinal axis intersects the prong; and
an inner surface of the prong engages the spring guide.

6. The valve of claim 5, wherein the inner surface of the prong is planar and an outer surface, opposite the inner surface, of the prong is curved.

7. The valve of claim 6, wherein the inner surface of the prong engages a head of the spring guide to prevent rotation of the spring guide about an axis parallel to the longitudinal axis of the bore of the casing.

8. The valve of claim 5, wherein
at least a portion of one of the two inlets is disposed in the pass-through aperture of the annular shoulder.

9. The valve of claim 1, wherein:
the bore in the casing is a first bore and the spring guide is a first spring guide;
the casing comprises a second bore and a second spring guide disposed within the second bore; and
the retaining cup engages and retains the second spring guide at least partially within the second bore.

10. The valve of claim 9, wherein:
the casing comprises a third bore and a third spring guide disposed within the third bore; and
the retaining cup engages and retains the third spring guide at least partially within the third bore.

11. The valve of claim 10, wherein:
the casing has a circular outer surface;
an annular shoulder of the retaining cup is disposed partially around and engages the circular outer surface of the casing; and
the first, second, and third bores are circumferentially distributed 120 degrees from each other.

12. The valve of claim 1, wherein the retaining cup is positioned between and directly engages an outer surface of the casing and an inner surface of the valve housing.

13. The retaining cup of claim 1, wherein the retaining cup is made from a stainless steel material.

14. A method of manufacturing a valve, the method comprising:
loading a spring guide within a bore of a casing;
positioning a retaining cup about an outer surface of the casing to engage and retain the spring guide at least partially within the bore of the casing; and
enclosing the casing within a valve housing;
wherein:
the bore in the casing is a first bore and the spring guide is a first spring guide;
the casing comprises a second bore and the method further comprises loading a second spring guide within the second bore; and
positioning the retaining cup comprises engaging and retaining the second spring guide at least partially within the second bore of the casing.

15. The method of claim 14, wherein positioning the retaining cup comprises aligning a prong of the retaining cup with the bore such that a head of the spring guide engages a planar inner surface of the prong.

16. The method of claim 14, wherein:
the retaining cup comprises an annular shoulder defining a pass-through aperture; and
a longitudinal axis of the bore is perpendicular to a central axis extending through the pass-through aperture.

* * * * *